A. W. DUNN.
MUZZLES FOR HORSES.
No. 179,405. Patented July 4, 1876.
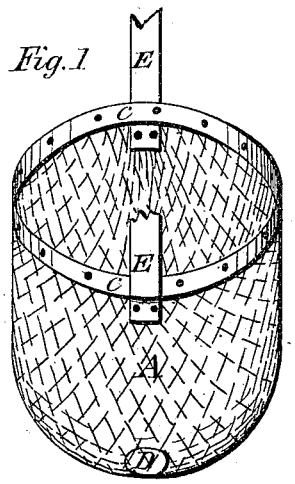
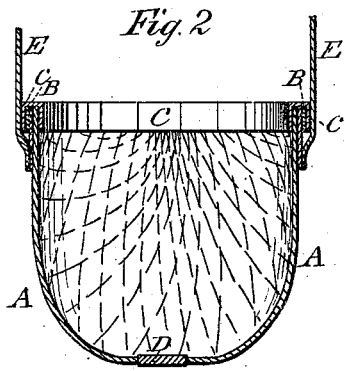
Attest:
Jno. A. Madigan
Wm. Bagger
Inventor:
Alfred W. Dunn,
by Louis Bagger
his Atty.

UNITED STATES PATENT OFFICE.

ALFRED W. DUNN, OF NEWARK, NEW JERSEY.

IMPROVEMENT IN MUZZLES FOR HORSES.

Specification forming part of Letters Patent No. 179,405, dated July 4, 1876; application filed December 16, 1875.

*To all whom it may concern:*

Be it known that I, ALFRED W. DUNN, of Newark, in the county of Essex and State of New Jersey, have invented certain new and useful Improvements in Horse-Muzzles; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a perspective view, and Fig. 2 is a vertical transverse section.

Similar letters of reference indicate corresponding parts in both the figures.

This invention consists in the manufacture, from wire or wire cloth, of a horse muzzle, the detailed construction of which is substantially as hereinafter described, and pointed out in the claim.

A is the body or basket of the muzzle, which is of the shape shown in the drawing, and formed of wire cloth, or wire braided or woven together. The shape and dimensions may, however, be varied, so as to fit the animal on which it is intended to be used. Around the outside of the top or rim of this body or basket is placed a strip or band, B, made of sheet metal, which serves the double purpose of bracing or stiffening the basket, and of preventing the wire cloth, of which this is made, from unraveling.

In order to protect the nose of the animal from injury, by coming in contact with the sharp edge or rim of the strip B, or with the projecting points of the wires $a$, on the inside of said rim, I employ a band, C, made of leather, rubber, or similar suitable material, which is doubled over the rim B, so as to cover both that and the wires, as shown.

A plate or button, D, is soldered or otherwise secured to the outside end or bottom of the basket A, for the purpose of protecting that part of it which is most exposed from wear or abrasion; and straps or bands E E are attached to the sides of the muzzle, by the aid of which it is affixed upon the head of the animal.

My improved wire muzzle is much lighter, cheaper, and more durable than the leather muzzles now generally in use. It does not absorb rain, perspiration, or saliva, and does not, therefore, become wet or spongy, while the air may circulate freely through it, so that it does in nowise interfere with the breathing of the animal.

Having thus described my invention, I claim and desire to secure by Letters Patent of the United States—

A horse-muzzle, made of wire cloth, or woven or braided wire, provided with the protecting plate or button D, substantially as and for the purpose hereinbefore set forth.

In testimony that I claim the foregoing as my own I have hereunto affixed my signature in presence of two witnesses.

ALFRED W. DUNN.

Witnesses:
 LEWIS P. EARL,
 H. M. LITTELL.